United States Patent [19]
Cole

[11] Patent Number: 5,656,244
[45] Date of Patent: Aug. 12, 1997

[54] SYSTEM FOR REDUCING $NO_x$ FROM MOBILE SOURCE ENGINE EXHAUST

[75] Inventor: Jerald A. Cole, Long Beach, Calif.

[73] Assignee: Energy and Environmental Research Corporation, Irvine, Calif.

[21] Appl. No.: 552,192

[22] Filed: Nov. 2, 1995

[51] Int. Cl.$^6$ ............................................. B01D 50/00
[52] U.S. Cl. .................... 422/171; 422/173; 422/175; 422/177; 422/178; 422/179; 422/180; 422/198; 422/206; 422/211; 422/222; 422/223; 60/297
[58] Field of Search ............................. 422/168–171, 422/173, 177, 175, 180, 178, 190, 179, 211, 198, 222–223, 206; 60/297, 295, 299, 296, 301; 55/267; 95/113, 114; 96/125, 130; 423/239.1, 212

[56] References Cited

U.S. PATENT DOCUMENTS

| | | | |
|---|---|---|---|
| 3,072,457 | 1/1963 | Bloch | 60/296 |
| 4,153,429 | 5/1979 | Matthews et al. | 95/117 |
| 4,533,365 | 8/1985 | Ringel | 95/114 |
| 4,701,189 | 10/1987 | Oliker | 95/113 |
| 4,764,187 | 8/1988 | Abrams | 95/14 |
| 4,775,484 | 10/1988 | Schmidt et al. | 210/673 |
| 4,778,492 | 10/1988 | Dawson | 95/113 |
| 4,849,111 | 7/1989 | Abrams | 210/673 |
| 4,915,922 | 4/1990 | Filss | 423/239.1 |
| 5,125,231 | 6/1992 | Patil et al. | 422/171 |
| 5,362,463 | 11/1994 | Stiles et al. | 423/239.1 |
| 5,457,958 | 10/1995 | Boegner et al. | 60/297 |
| 5,471,836 | 12/1995 | Takeshima et al. | 60/297 |

*Primary Examiner*—Robert J. Warden
*Assistant Examiner*—Hien Tran
*Attorney, Agent, or Firm*—Workman, Nydegger & Seeley

[57] ABSTRACT

A process and system for reducing cold start $NO_x$, carbon monoxide, and hydrocarbon emissions from mobile source engine exhaust utilizes adsorption and desorption of $NO_x$ compounds on a regenerable sorbent material. Molecules of $NO_x$ are adsorbed onto the sorbent material during the ineffective warm up period of a three-way catalytic converter. When the catalytic converter reaches operating temperatures, the $NO_x$ molecules are thermally desorbed from the sorbent material and delivered to the catalytic converter for effective reduction to molecular nitrogen.

15 Claims, 7 Drawing Sheets

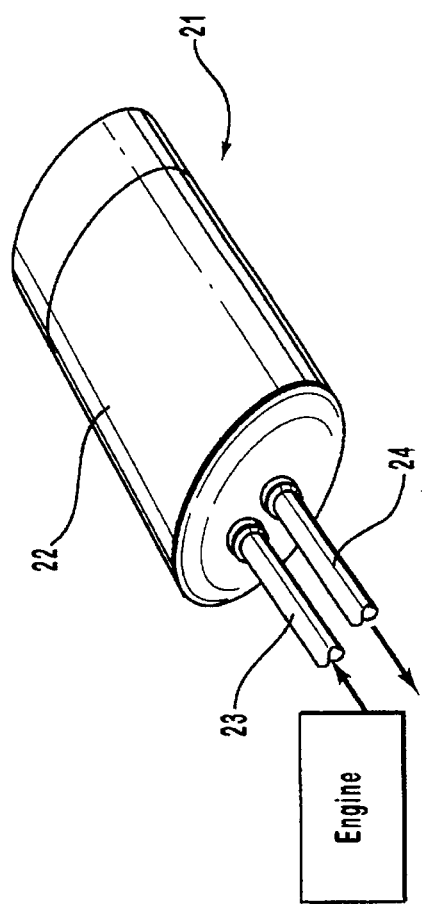
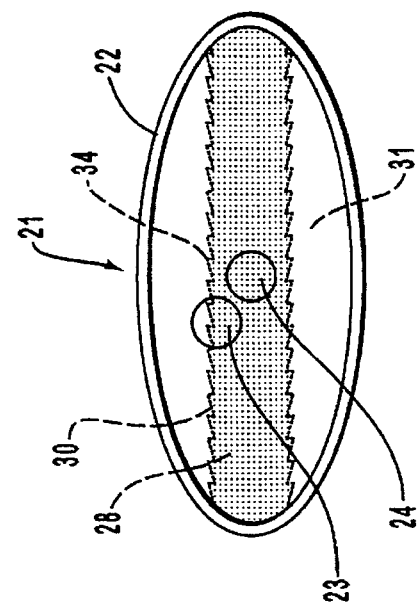
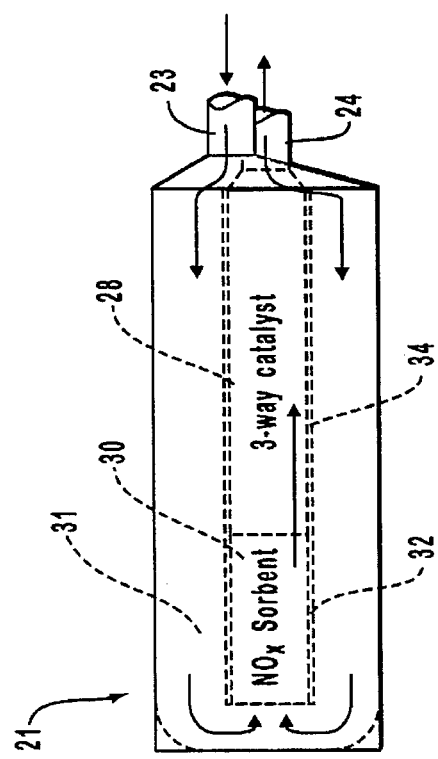
FIG. 3A
FIG. 3B
FIG. 3C

SYSTEM FOR REDUCING NO$_x$ FROM MOBILE SOURCE ENGINE EXHAUST

BACKGROUND OF THE INVENTION

1. The Field of the Invention

The present invention relates to a process and system for reducing pollutants from the engine exhaust of automobiles and other mobile sources. More particularly, the present invention relates to a process and system for removing oxides of nitrogen (NO$_x$) in such a way as to simultaneously permit reduction of the emissions of carbon monoxide, unburned hydrocarbons, and other byproducts of internal combustion engine operation.

2. The Relevant Technology

In many parts of the United States, automobiles account for much of the total NO$_x$ burden on the environment. This is especially notable in areas such as southern California where estimates made by the South Coast Air Quality Management District suggest that over half of the total anthropogenic NO$_x$ is due to automobiles. In addition to concerns over acid rain, it has been suggested that failure to adequately control NO$_x$ emissions is also partly responsible for ozone non-attainment in many areas.

Catalytic converters have been used for pollutant removal from automotive exhaust for many years. Increasingly stringent government regulations for the allowable emission levels of carbon monoxide (CO), hydrocarbons (HC), and NO$_x$ have resulted in a majority of gasoline-powered vehicles operated in the United States being equipped with three-way catalytic converters. The "three-way" catalysts in such converters oxidize carbon monoxide and hydrocarbons, while simultaneously reducing NO$_x$. Thus, three-way catalysts are capable of removing all three of the above pollutants simultaneously, provided that the catalyst is maintained in a chemically correct environment that is neither over oxidizing or reducing.

Catalytic converters are quite efficient at reducing NO$_x$ emissions at normal operating temperatures, but are not effective during the first minute or two after initial engine start-up, when the catalytic converter is essentially cold. It has been estimated that during this warm up period, one-half of an automobile's NO$_x$ emissions are released. Automobile emissions account for about 50% of the total NO$_x$ inventory in many urban areas. Accordingly, if NO$_x$ could be largely eliminated during the warm up period of a catalytic converter, then conceivably up to about 25% of the total NO$_x$ inventory could be eliminated in many urban areas.

During cold start conditions, most automobile engines operate with a fuel-rich stoichiometry in order to reduce NO$_x$ emissions prior to the catalytic converter heating up. While this allows smooth engine operation and sufficient cold power, CO and hydrocarbon emissions increase significantly. Internal combustion engines using newer technology can efficiently operate fuel-lean during cold start conditions. This fuel-lean operation reduces CO and hydrocarbon emissions and slightly reduces fuel consumption. A fuel-lean cold start can also, however, significantly increase NO$_x$ formation.

Air pollution regulations are becoming stricter in most urban areas and as a result, rigid emissions limits are being placed on mobile sources. If "cold start" NO$_x$ start up emissions could be diminished or eliminated, the concurrent reduction of CO and unburned hydrocarbon emissions in newer engines would result in a total reduction of automotive exhaust emissions in urban areas by as much as 85 percent according to some estimates.

The reversible adsorption of NO$_x$ on numerous sorbents, including supported transition metal oxides (M$^{II}$O, M$^{III}_2$O$_3$ or M$^{II,III}_3$O$_4$) has been demonstrated previously. For example, U.S. Pat. No. 5,362,463 to Stiles et al. discloses a method for preparation of a solid sorbent capable of removing NO$_x$ from gases containing combustion products. This sorbent consists of a transition metal oxide, preferably manganese dioxide, promoted by potassium carbonate and supported on alumina.

Several patents have discussed processes in which contaminant constituents in a gas stream are adsorbed onto a sorbent, and the sorbent is later regenerated to be re-used immediately. These patents include U.S. Pat. Nos. 4,764,187 and 4,849,111 to Abrams, U.S. Pat. No. 4,778,492 to Dawson, and U.S. Pat. No. 4,915,922 to Filss. The regeneration step in each of these patents, however, utilizes chemical desorption. Chemical desorption typically requires that the sorbent regeneration step occurs using a fluid completely free of the contaminant being desorbed, which would not be practical for automotive engine applications.

In U.S. Pat. No. 4,775,484 to Schmidt, a sorption bed system is disclosed that uses a regenerable sorbent to remove a contaminant from a gas stream. This system, however, includes 3 distinct zones, and rotates around an axis to expose the individual zones to the desired gas stream. These characteristics would not be economically or strategically attractive for application to mobile source engine exhaust.

Accordingly, there is a need for a process and system to improve start up emissions from mobile source engine exhaust.

SUMMARY AND OBJECTS OF THE INVENTION

In view of the present state of the art, a principle object of the present invention is to provide a process and system for the significant reduction in mobile source cold start NO$_x$, allowing total hydrocarbons and CO emissions to also be reduced.

Another object of the present invention is to significantly reduce mobile source emissions to meet air pollution control standards using adsorption and desorption processes.

A further object of the present invention is to help automotive manufacturers and air pollution regulators obtain desired emissions standards.

An additional object of the present invention is to provide a pollution control system that is a single, self-enclosed package similar in shape and size to typical three-way catalytic converters currently installed in most automobiles.

Another object of the present invention is to provide a process and system for controlling emissions that can be economically applied to current automotive systems.

A further object of the present invention is to provide a pollution control system that can be installed on mobile sources during assembly thereof, with little or no impact on relative manufacturing costs or engine operation.

These and other objects and features of the present invention will become more fully apparent from the following description and appended claims, or may be learned by the practice of the invention as set forth hereinafter.

To achieve the foregoing objects, and in accordance with the invention as embodied and broadly described herein, a process and system have been developed for controlling and substantially reducing polluting emissions from mobile source engine exhaust, such as the exhaust from automobiles, trucks, and other vehicles. Although the present invention as described herein is primarily for engines using three-way catalytic converters, such as internal combustion engines, other types of engines can also utilize the process and system of the invention.

The process of the invention comprises adsorbing $NO_x$ molecules from engine exhaust onto a regenerable sorbent material having a temperature below an $NO_x$ desorption temperature thereof during the ineffective warm up period of a three-way catalytic converter. The $NO_x$ molecules are thermally desorbed from the sorbent material when the catalytic converter reaches an operating temperature and the temperature of the sorbent material reaches at least the $NO_x$ desorption temperature. The desorbed $NO_x$ molecules are then passed through the catalytic converter to substantially reduce the $NO_x$ molecules to molecular nitrogen before being vented to the atmosphere.

A system for controlling emissions that uses the process of the invention includes an $NO_x$ adsorbing regenerable sorbent material, a three-way catalytic converter disposed adjacent to the sorbent material, and means for directing the exhaust to flow through the sorbent material and the catalytic converter. The system also includes means for venting the "clean" exhaust to the atmosphere.

In one embodiment of the system of the invention, a casing encloses a bed of a regenerable sorbent material disposed adjacent to a three-way catalyst material. An inlet duct communicates with the casing to allow engine exhaust to pass through the sorbent material and the three-way catalyst in the casing. An outlet duct communicates with the casing to allow exhaust exiting from the casing to be vented to the atmosphere. A valve is operatively connected to the inlet duct and the outlet duct. The valve directs the exhaust from the inlet duct to flow through the catalyst material prior to the sorbent material during a cold start condition such that $NO_x$ molecules are adsorbed by the sorbent material having a temperature below an $NO_x$ desorption temperature. The valve redirects the exhaust from the inlet duct to flow through the sorbent material prior to the catalyst material when the catalyst material reaches an operating temperature.

In another embodiment of the system of the invention, a valveless design is used. This system includes a casing enclosing a bed of a regenerable sorbent material disposed adjacent to a three-way catalyst material. The bed has an insulating layer surrounding the sorbent material and a heat transfer promoting means surrounding the catalyst material. An inlet duct communicates with the casing to allow passage of exhaust from the engine into the casing, and an outlet duct communicates with the casing to allow exhaust exiting from the casing to be vented to the atmosphere. A passageway in the casing directs exhaust from the inlet duct to flow around the outside of the bed before passing through the sorbent material and then the catalyst material. The exhaust directed around the bed heats the catalyst material to operating temperatures while $NO_x$ molecules are adsorbed from the exhaust by the sorbent material having a temperature below an $NO_x$ desorption temperature. The catalyst material reduces the $NO_x$ molecules to molecular nitrogen once the catalyst material reaches operating temperatures and the sorbent material reaches at least the $NO_x$ desorption temperature.

An engine using the present invention is preferably operated under fuel lean conditions during cold start conditions while the $NO_x$ molecules are being adsorbed, in order that emissions of additional pollutants other than $NO_x$, such as carbon monoxide, hydrocarbons, and other organic compounds, may be lowered. Since operating fuel lean during start-up can significantly reduce CO and hydrocarbon emissions, application of the process of the invention would greatly improve the total emissions of mobile sources.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 3A to 3C are schematic diagrams illustrating a second embodiment of a system that uses the process of the invention as applied to a spark ignition automobile exhaust system.

DETAILED DESCRIPTION OF THE INVENTION

Figure 1A:
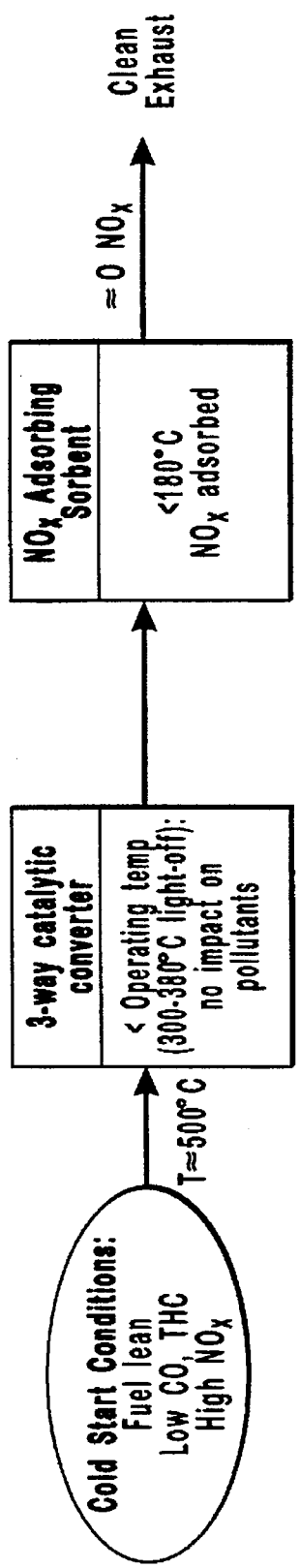
FIGS. 1A and 1B are flow charts illustrating the regenerable $NO_x$ adsorbing and desorbing process of the present invention.

The present invention is directed to a process and system for controlling engine exhaust emissions from mobile sources, such as automobiles, tracks, and other vehicles. Although the present invention is primarily intended for mobile engines equipped with three-way catalytic converters, other types of engines can also utilize the process and system of the invention.

The task of the catalytic converter is to promote chemical reactions for the conversion of pollutants such as carbon monoxide (CO), hydrocarbons (HC), and $NO_x$ to carbon dioxide, water, and nitrogen. For automotive exhaust applications, the pollutant removal reactions are the oxidation of carbon monoxide and hydrocarbons and the reduction of nitrogen oxides. Metal materials are the catalytic agents most often employed in catalytic converters. Small quantities of these metals, when present in a highly dispersed form, provide sites upon which the reactive molecules may interact and the reaction proceed. Three-way catalysts used in catalytic converters generally include materials such as platinum, palladium, and rhodium.

Catalytic converters are quite efficient at reducing $NO_x$ emissions at normal operating temperatures, but are not effective during the first minute or two after initial engine start-up during the period known as "cold start" when the catalytic converter is essentially cold. Accordingly, the process and system of the invention substantially reduces or eliminates these cold start emissions.

For engines equipped with catalytic converters, the process of the invention removes $NO_x$ molecules that are produced by the engine shortly after start-up during the cold start period. The $NO_x$ molecules are adsorbed by a solid regenerable $NO_x$ adsorbing sorbent material during the cold start period, while the catalytic converter is too cold to be effective. After the catalytic converter has reached operating temperatures, the $NO_x$ molecules are thermally desorbed from the sorbent material and delivered to the catalytic converter where the $NO_x$ molecules are substantially reduced to molecular nitrogen ($N_2$) before being vented to the atmosphere. The use of thermal desorption in the process of the invention allows the same exhaust gas stream to be used during both the adsorption and desorption steps.

The $NO_x$ adsorbing sorbent material used in the present invention can be selected from a variety of sorbents as long as the desired $NO_x$ adsorbing characteristics are present. Nonlimiting examples of suitable sorbent materials include various metal oxides such as chromium oxide, copper oxide, nickel oxide, manganese molybdenum oxide, and cobalt oxide. Various mixtures or combinations of the above metal oxide compounds may also be used. Other metals and compounds capable of reversibly adsorbing $NO_x$ may also be utilized as the sorbent material. Furthermore, the present invention can use sorbent materials such as those disclosed in U.S. Pat. No. 5,362,463 to Stiles et al., which is incorporated herein by reference.

The sorbent material used in the present invention can be supported on a support material such as alma, mullite, cordierite, silicon carbide, or other ceramic formed into beads or pellets, or extruded monolithic shapes, or other suitable inorganic support materials compatible with the sorbent. The support material increases the available surface area of the sorbent and can modify the chemical and physical properties of the sorbent.

Figure 1B:
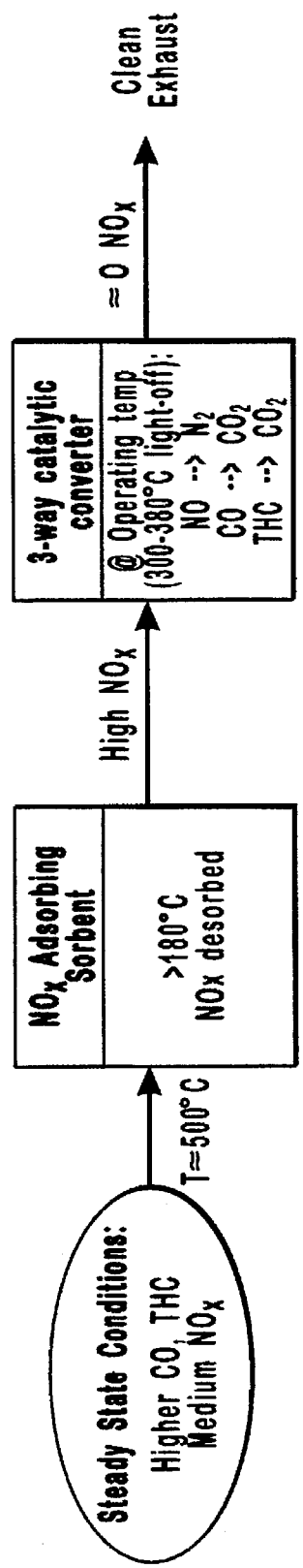

The process of the invention is depicted in the flow charts of FIGS. 1A and 1B. The process has two (2) different stages related to cold start conditions and steady state conditions. During the cold start condition, the process allows the engine to operate fuel lean, minimizing carbon monoxide and total hydrocarbons (THC) emissions at the expense of elevated $NO_x$ emissions. As shown in FIG. 1A, the high $NO_x$ exhaust gas flows through the three-way catalytic converter, unaffected because the catalytic converter is below operating temperature. The heat from the exhaust gas is used to raise the temperature of the catalyst in the catalytic converter from an ambient to an operating temperature of at least about 300° C. A temperature range from about 300° C. to about 380° C. for the catalytic converter is referred to as the "light-off" temperature. The exhaust gas is then sent through the $NO_x$ adsorbing sorbent material, which during start-up conditions is below the $NO_x$ desorption temperature of at least about 180° C. At these temperatures, $NO_x$ molecules are selectively and substantially removed from the exhaust gas stream, attaching to the sorbent surface through physisorption and chemisorption processes. Finally, the "clean" exhaust is emitted to the atmosphere.

Within about 1–2 minutes, the three-way catalytic converter reaches an operating temperature of at least about 300° C. The operating catalytic converter reduces $NO_x$ to molecular nitrogen, while oxidizing carbon monoxide to carbon dioxide ($CO_2$) and oxidizing the total hydrocarbons to $CO_2$ and water. At this point it is desirable to desorb or strip the $NO_x$ from the sorbent surface and deliver the $NO_x$ to the catalyst material for reduction to $N_2$. This procedure is shown in the flow chart of FIG. 1B under the steady state conditions. Typical steady state engine operating conditions produce significant amounts of CO, THC and $NO_x$. As the warm exhaust gas flows through the heated $NO_x$ adsorbing sorbent material, which is at a desorption temperature of about 180° C. or greater, the $NO_x$ molecules on the surface of the sorbent material desorb back into the exhaust gas stream. The high $NO_x$ exhaust gas then flows through the catalytic converter, which effectively reduces the desorbed $NO_x$ to $N_2$. The clean exhaust gas is then vented to the atmosphere.

Figure 2A:
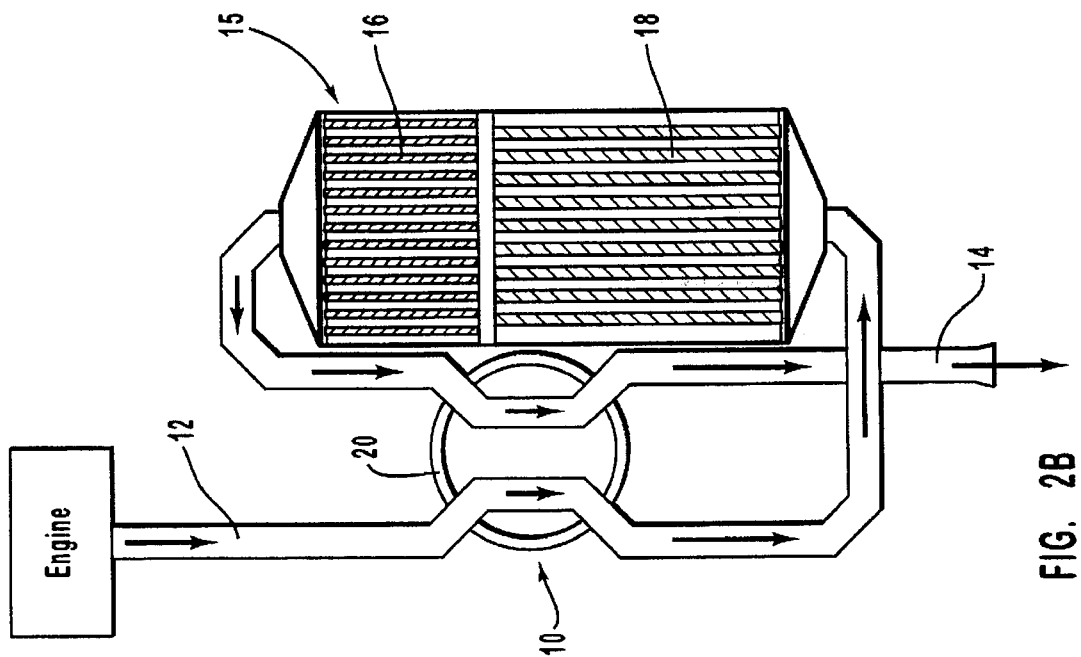
FIGS. 2A and 2B are schematic diagrams depicting one embodiment of a system that uses the process of the invention as applied to a spark ignition automobile exhaust system.
Figure 2B:
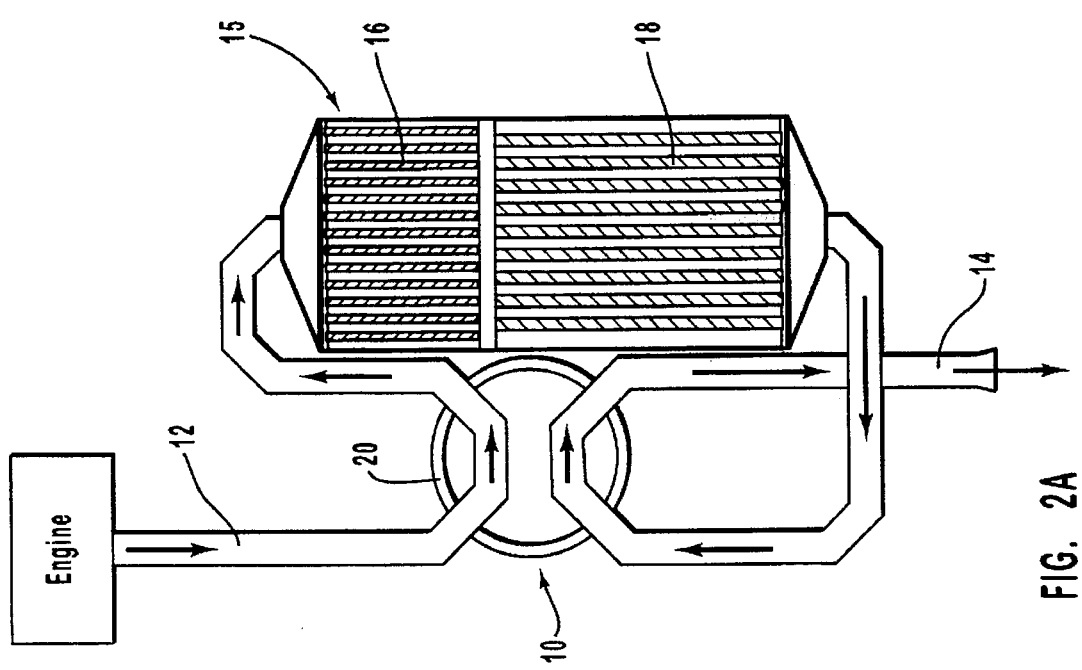

The process of the invention is widely applicable. FIGS. 2A and 2B are schematic diagrams showing one embodiment of an exhaust system 10 that can utilize this process in a spark ignition automotive exhaust application. The exhaust system 10 includes an engine exhaust inlet duct 12 and an outlet duct 14 for venting the exhaust gas to the atmosphere. A casing 15 houses a three-way catalyst 16 disposed adjacent to a solid regenerable $NO_x$ adsorbing sorbent material 18. Engine exhaust enters through inlet duct 12 and ultimately exits to the atmosphere through outlet duct 14. A valve 20 is used to direct the exhaust flow in a desired direction. During cold start conditions, it is desirable to flow the warm exhaust gas through three-way catalyst 16 first to allow the catalyst to reach operating temperatures before the sorbent material reaches $NO_x$ desorption temperatures. As shown in FIG. 2A, valve 20 directs the exhaust to flow through catalyst 16 before passing through sorbent material 18. When operating temperatures are reached in catalyst 16, the exhaust gas is redirected by valve 20 to flow through sorbent material 18 before catalyst 16, as depicted in FIG. 2B. At this point, sorbent material 18 has warmed up to $NO_x$ desorption temperatures and $NO_x$ molecules start to desorb into the exhaust gas stream. These desorbed $NO_x$ molecules are then reduced by catalyst 16 which is at operating temperatures.

FIGS. 3A, 3B, and 3C illustrate another embodiment of an exhaust system 21 that can use the process of the invention in a spark ignition automotive exhaust application. The exhaust system 21 does not use a valve or any moving parts. FIG. 3A shows an exterior perspective view of exhaust system 21, which can be only slightly larger and of similar shape as catalytic converters currently used in automobile applications. The exhaust system 21 includes a casing 22 with an engine exhaust inlet duct 23 and an outlet duct 24 for venting 14 exhaust gas to the atmosphere. A side view and front view of exhaust system 21 are depicted in FIGS. 3B and 3C, respectively.

A bed of a three-way catalyst material 28 and an $NO_x$ adsorbing sorbent material 30 occupy only a portion of casing 22, leaving a passageway 31 surrounding catalyst material 28 and sorbent material 30, as shown in FIGS. 3B and 3C. The passageway 31 spans the entire length of casing 22. Engine exhaust enters casing 22 through inlet duct 23 and is directed into passageway 31. The passageway 31 directs the exhaust to flow around the outside of the bed of catalyst material 28 and sorbent material 30 to the opposite end of casing 22 before the exhaust passes through sorbent material 30 and then catalyst material 28. As the exhaust flows through passageway 31, the exhaust flows around catalyst material 28 before sorbent material 30.

A means for promoting heat transfer from the exhaust to catalyst material 28 is also provided to allow catalyst material 28 to heat up to operating temperatures as soon as possible. As depicted in FIGS. 3B and 3C, this heat transfer means comprises a plurality of fins 34 formed on the outer surface of catalyst material 28 to increase the surface area thereof. It will be appreciated that the heat transfer means can be implemented using various other equivalent structures for increasing the heat transfer surface area and be within the intended scope of the invention. For example, these other structures may include, but are not limited to, heat pipes, baffles around the catalyst material, heat channels through the catalyst material, spikes through the catalyst material, external and internal fins (including straight fins, annular fins, and pin fins), grooves on the outer surface of the catalyst material, or any extended surface or other device or process that serves to increase the rate of transfer of heat from the exhaust gases to the catalyst material. Heat transfer from the exhaust to sorbent material 30 is minimized by use of an insulating layer 32 surrounding sorbent material 30, as shown in FIG. 3B.

When the exhaust gas reaches the end of casing 22, the exhaust gas is directed through sorbent material 30 initially, then through catalyst material 28, and ultimately exhausted into the atmosphere through outlet duct 24. The objective of the design of exhaust system 21 is to heat catalyst material 28 with the exhaust gas as quickly as possible while keeping the temperature of sorbent material 30 as low as possible. By the time sorbent material 30 reaches $NO_x$ desorption temperatures, a significant portion of catalyst material 28 will be at operating temperatures, capable of reducing the $NO_x$ molecules desorbing from sorbent material 30 to produce molecular nitrogen.

Figure 4A:
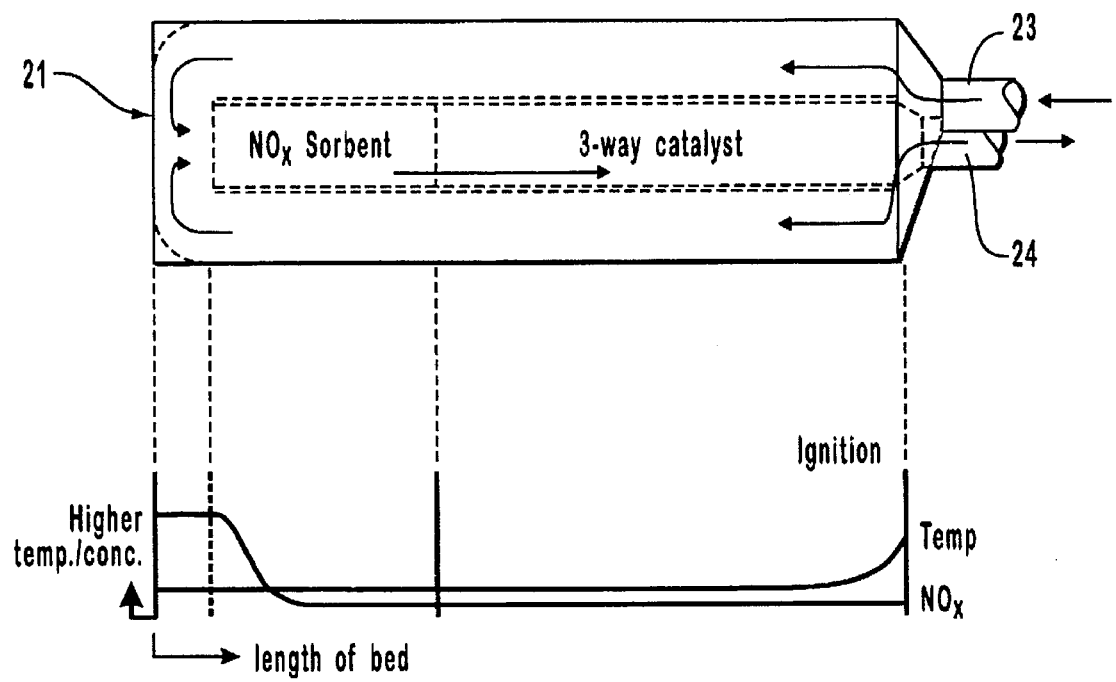
FIGS. 4A to 4D are schematic diagrams illustrating the sequence of temperature and $NO_x$ concentration trends that occur in the sorbent and catalyst bed of FIG. 3B during a complete cycle as operated in an automotive application.
Figure 4B:
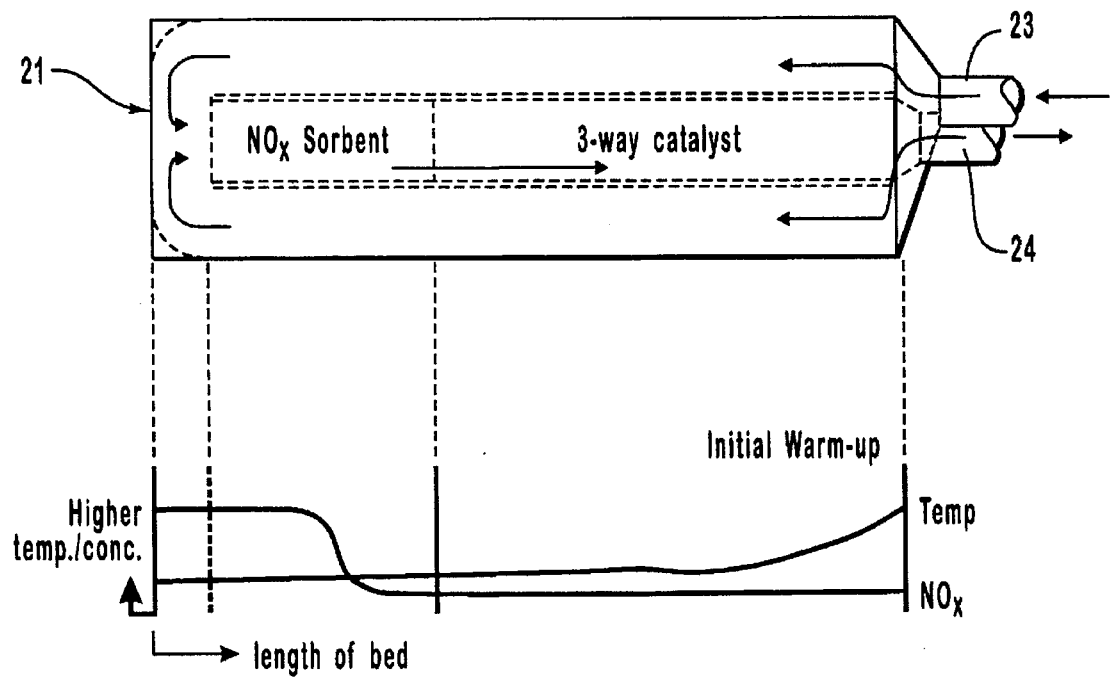
Figure 4C:
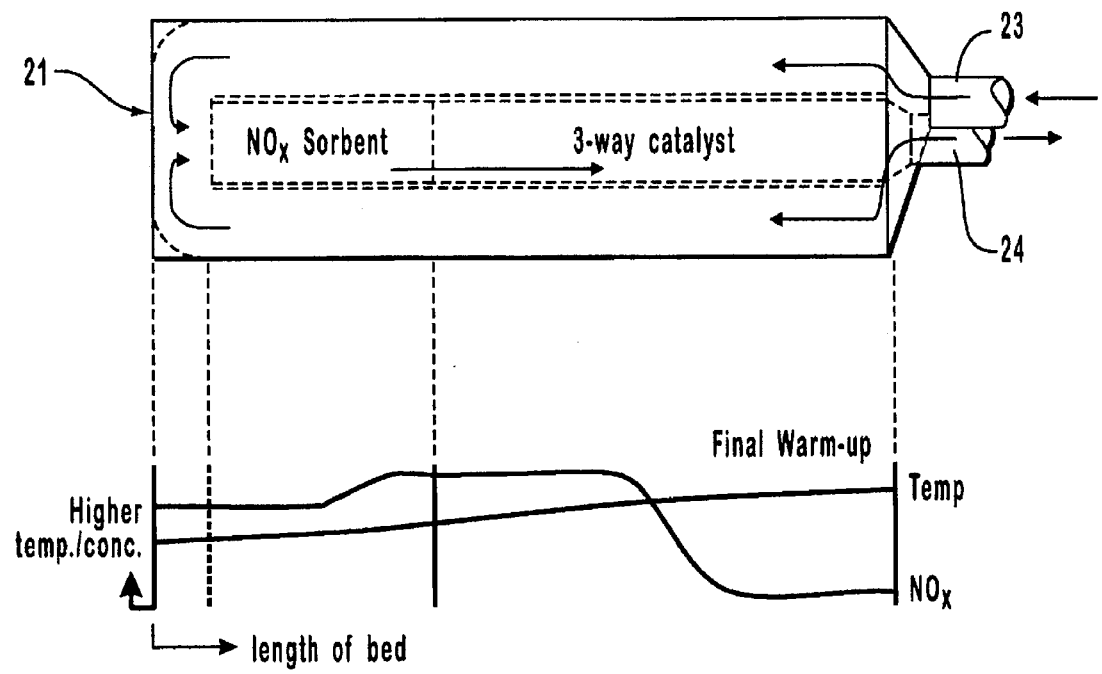
Figure 4D:
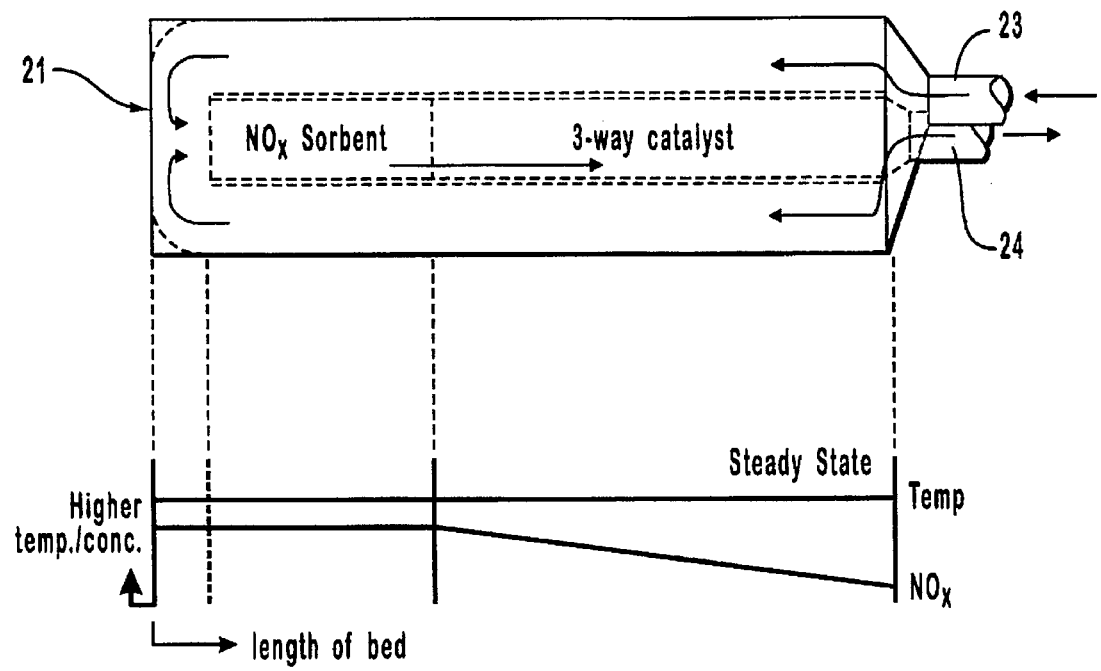

FIGS. 4A to 4D are a series of diagrams illustrating the sequence of changes in bed temperature and exhaust gas $NO_x$ concentration in exhaust system 21, from ignition (cold start) to steady state conditions. The temperature and $NO_x$ profiles depicted in FIGS. 4A to 4D correlate to locations along the length of the sorbent and catalyst bed used in exhaust system 21. During ignition, the exhaust $NO_x$ concentration is high prior to entrance of the exhaust into the sorbent material, as shown in FIG. 4A. The $NO_x$ concentration immediately drops to about zero as $NO_x$ adsorbs onto the sorbent material at the correlating low temperatures. During initial warm-up, the sorbent material begins to saturate and the temperature of the three-way catalyst begins to increase, as depicted in FIG. 4B. Still, the exhaust $NO_x$ concentration is approximately zero as the $NO_x$ continues to adsorb onto the sorbent material. Final warm-up takes the sorbent temperature above the desorption point of about 180° C., and $NO_x$ begins to desorb from the sorbent surface and re-enter the exhaust gas stream, as shown in FIG. 4C. At this point, the three-way catalyst has heated to operating temperatures, and the desorbed $NO_x$ is reduced to molecular nitrogen within the catalyst bed. FIG. 4D depicts the steady state condition, in which nearly all the exhaust $NO_x$ is reduced to $N_2$ within the three-way catalyst.

A significant advantage of the invention is that an engine using the present process and system can be operated under fuel lean conditions during cold start conditions while the $NO_x$ molecules are being adsorbed, in order that emissions of additional pollutants other than $NO_x$, such as carbon monoxide, hydrocarbons, and other organic compounds, may be lowered. Such a fuel-lean operation during cold start has been otherwise avoided in prior systems in order to attenuate $NO_x$ emissions. Since operating fuel lean during start-up can significantly reduce CO and hydrocarbon emissions, application of the process of the invention would greatly improve the total emissions of mobile sources.

Another advantage of the present invention is that a single, self-enclosed package may be used, similar in shape and size to typical three-way catalytic converters currently installed in most automobiles. This makes conversion of old systems to the present system feasible and salable. The system of the present invention can also be installed on mobile sources during assembly thereof, with little impact on relative manufacturing costs or engine operation.

Although the above description of the invention has focused on internal combustion engines for transportation applications, the process of the invention may also be used in other applications including, but not limited to, diesel trucks and buses, heavy machinery and farm equipment, marine engines, direct-fired and indirect-fired power turbines, as well as any device or process that emits $NO_x$ or uses or is capable of using a catalyst for control of $NO_x$.

The specific embodiments discussed above should not be construed as limitations on the scope of the invention, but rather as exemplifications of preferred embodiments. Many variations are possible. For example, if the process of the invention is used on heavy equipment devices, the actual design of the sorbent/catalyst arrangement may differ to meet the given requirements and specifications.

The following examples are given to illustrate the present invention, and should not be viewed as limiting the scope of the invention.

EXAMPLE 1

Laboratory experiments were performed to determine the $NO_x$ adsorbing effectiveness of several potential sorbent materials. These experiments were performed using a precision flow system, which is a device used to accurately meter and mix blends of gases. This system consisted of four parts: (1) a gas blending system, (2) a liquid injection system, (3) a reactor, and (4) an analytical train. The gas blending system was used to blend a gas mixture with individual gas component concentrations typical of spark ignition engine exhaust. Water vapor was added by injecting liquid water into the gas stream using the liquid injection system. Reactor temperature was varied to simulate various conditions. The analytical train measured NO and $NO_2$ concentrations throughout the adsorption/desorption steps. Several potential sorbent materials were tested.

Figure 5:
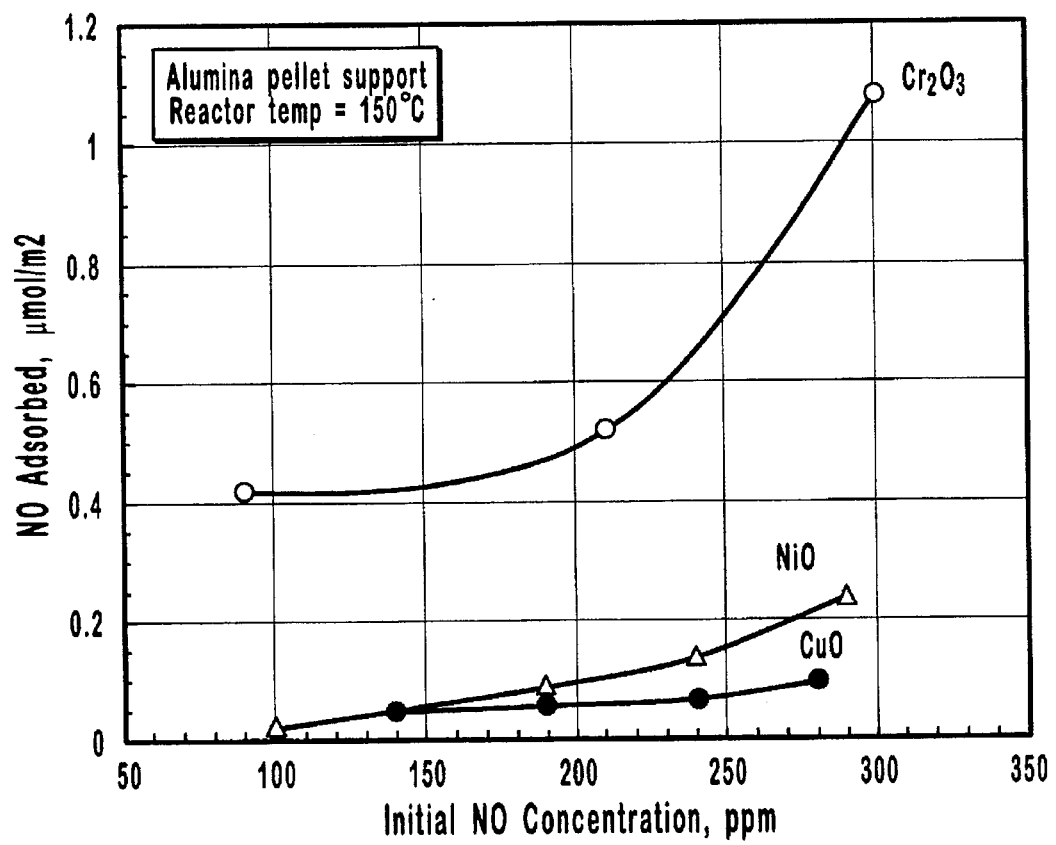
FIG. 5 is a graph displaying experimental results revealing adsorption isotherm capabilities of several sorbent materials.

FIG. 5 is a graph of the experimental results, showing the NO adsorption isotherm capabilities of three sorbent materials, including chromium oxide ($Cr_2O_3$), nickel oxide (NiO), and copper oxide (CuO). All three sorbents were supported on alumina pellets or beads. The reactor temperature was held constant at 150° C. While all three sorbent materials demonstrated NO adsorption capabilities, chromium oxide performed optimally under the given experimental conditions.

EXAMPLE 2

Figure 6:
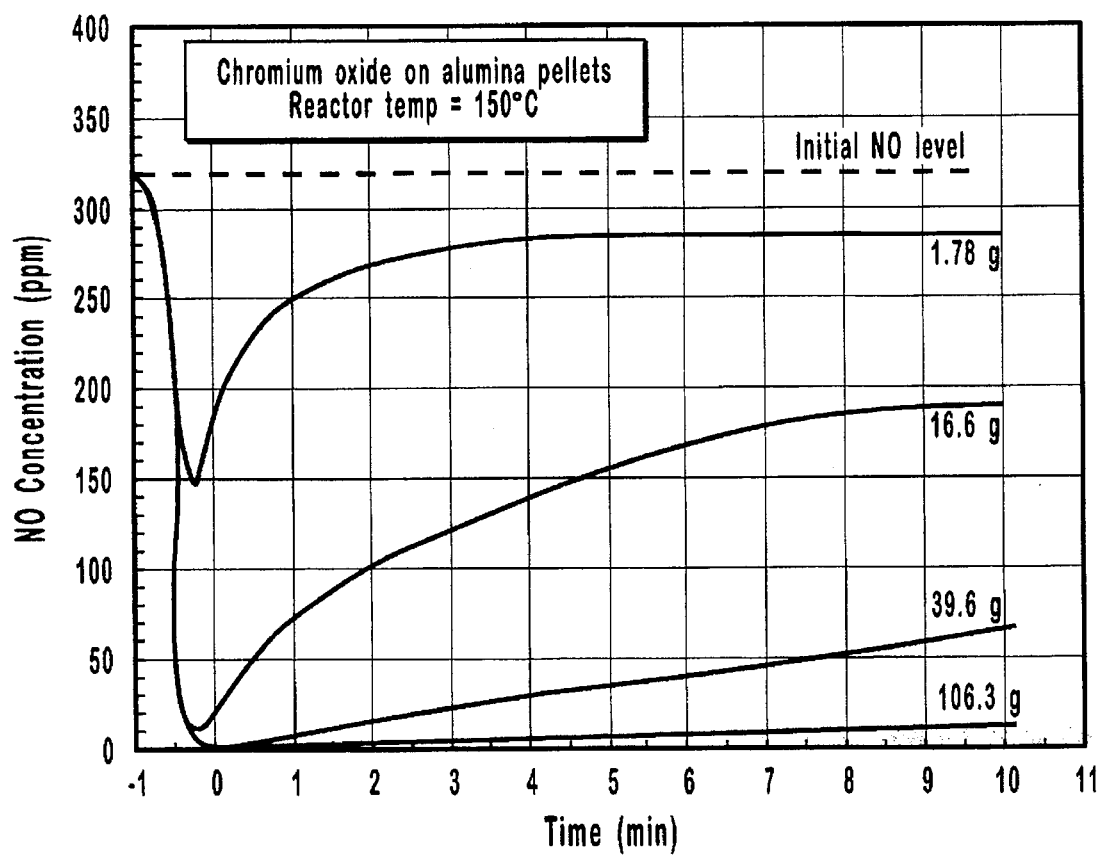
FIG. 6 is a graph showing experimental results depicting the impact of sorbent mass on adsorption endurance.

Laboratory experiments were performed using the precision flow system described in Example 1 to measure NO at the reactor exit while various amounts of alumina supported chromium oxide were exposed to simulated engine exhaust at 150° C. FIG. 6 is a graph of the results of these experiments, depicting the impact of sorbent mass on adsorption endurance. Time zero corresponds to the initial exposure of clean, unexposed sorbent to the gas stream. When adequate amounts of sorbent are present, the gas stream NO is initially 100 percent adsorbed, demonstrated by exit NO concentrations of zero. This adsorption slowly tapers with time. When more sorbent is present, NO adsorption remains effective longer, as would be expected.

These results demonstrate the capability of chromium oxide, and other sorbents, to adsorb cold start $NO_x$ during engine warm up periods. As long as a sufficient quantity of sorbent is present, i.e., the sorbent does not become saturated with $NO_x$ molecules during the warm up period, $NO_x$ emissions will remain approximately zero. When the three-way catalytic converter has reached operating temperatures, the adsorbed $NO_x$ can be desorbed and directed into the catalytic converter to be reduced to molecular nitrogen.

Thus, the process and system of the invention can significantly reduce mobile source emissions to meet air pollution control standards using adsorption and desorption processes. In addition, due to its simple design, the process of the invention can be economically applied to current automotive systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. A system for controlling emissions from an internal combustion engine, comprising:
   (a) a casing enclosing a bed of a regenerable sorbent material disposed adjacent to a three-way catalyst material, the bed including an insulating layer surrounding the sorbent material and means for promoting heat transfer surrounding the catalyst material;
   (b) an inlet duct communicating with the casing to allow passage of exhaust from an engine into the casing;
   (c) an outlet duct communicating with the casing to allow exhaust exiting from the casing to be vented to the atmosphere;
   (d) means for providing communication between the inlet duct and the bed so that exhaust from the inlet duct flows around the outside of the bed before passing through the sorbent material and then the catalyst material;

wherein the exhaust heats the catalyst material to a light-off temperature while $NO_x$ molecules are adsorbed from the exhaust by the sorbent material having a temperature below an $NO_x$ desorption temperature, and the catalyst material reduces the $NO_x$ molecules to molecular nitrogen once the catalyst material reaches the light-off temperature and the sorbent material reaches at least the desorption temperature.

2. The system of claim 1, wherein the light-off temperature of the catalyst material is at least about 300° C., and the $NO_x$ desorption temperature for the sorbent material is at least about 180° C.

3. The system of claim 1, wherein the sorbent material is selected from the group consisting of chromium oxide, nickel oxide, copper oxide, manganese oxide, iron oxide, zinc oxide, molybdenum oxide, cobalt oxide, and mixtures thereof.

4. The system of claim 3, wherein the sorbent material is supported on alumina beads.

5. The system of claim 1, wherein the means for promoting heat transfer comprises a plurality of fins formed on an outer surface of the catalyst material.

6. The system of claim 1, wherein the means for providing communication is defined by the casing and the bed therein which form a passageway therebetween.

7. A system for controlling the emissions from an engine, comprising:
   (a) a casing enclosing a bed of regenerable sorbent material disposed adjacent to a three-way catalyst material, the bed including an insulating layer surrounding the sorbent material and a heat transfer structure surrounding the catalyst material, wherein the casing and the bed define a passageway therebetween so that exhaust from an engine flows around the outside of the bed before passing through the sorbent material and then the catalyst material;
   (b) an inlet duct communicating with the casing to allow passage of exhaust from the engine into the casing; and
   (c) an outlet duct communicating with the casing to allow exhaust exiting from the casing to be vented to the atmosphere;

wherein the exhaust heats the catalyst material to a light-off temperature while $NO_x$ molecules are adsorbed from the exhaust by the sorbent material having a temperature below an $NO_x$ desorption temperature, and the catalyst material reduces the $NO_x$ molecules to molecular nitrogen once the catalyst material reaches the light-off temperature and the sorbent material reaches at least the desorption temperature, the light-off temperature of the catalyst material being at least about 300° C., and the $NO_x$ desorption temperature for the sorbent material being at least about 180° C.

8. The system of claim 7, further comprising an engine in communication with the inlet duct, wherein the $NO_x$ molecules from the exhaust are adsorbed by the sorbent material while the engine is operated under fuel lean conditions during a cold start condition in order that emissions of additional pollutants including carbon monoxide and hydrocarbons are reduced.

9. The system of claim 7, wherein the sorbent material is selected from the group consisting of chromium oxide, nickel oxide, copper oxide, manganese oxide, iron oxide, zinc oxide, molybdenum oxide, cobalt oxide, and mixtures thereof.

10. The system of claim 7, wherein the sorbent material is supported on alumina beads.

11. The system of claim 7, wherein the heat transfer structure surrounding the catalyst material is selected from the group consisting of heat pipes, baffles around the catalyst material, fins on an outer surface of the catalyst material, and grooves in an outer surface of the catalyst material.

12. The system of claim 7, wherein the engine is an internal combustion engine.

13. The system of claim 7, wherein the engine is selected from the group consisting of diesel engines, marine engines, and turbine engines.

14. The system of claim 7, further comprising a heat transfer structure within the catalyst material.

15. The system of claim 14, wherein the heat transfer structure within the catalyst material is selected from the group consisting of heat channels through the catalyst material, spikes through the catalyst material, and internal fins.

* * * * *

UNITED STATES PATENT AND TRADEMARK OFFICE
CERTIFICATE OF CORRECTION

PATENT NO. : 5,656,244
DATED : August 12, 1997
INVENTOR(S) : Jerald A. Cole

It is certified that error appears in the above-identified patent and that said Letters Patent is hereby corrected as shown below:

Col. 5, line 22, after "manganese" insert --oxide, iron oxide, zinc oxide,--

Col. 5, line 31, delete "alma" and insert therefor --alumina--

Col. 6, line 47, delete reference numeral "14"

Signed and Sealed this

Nineteenth Day of May, 1998

Attest:

BRUCE LEHMAN

Attesting Officer

Commissioner of Patents and Trademarks